Oct. 11, 1932.   N. M. MARSILIUS   1,881,794
CAM MILLING MACHINE
Filed June 5, 1929   3 Sheets-Sheet 1

INVENTOR.
Newman M. Marsilius
BY
Chamberlain & Newman
ATTORNEYS.

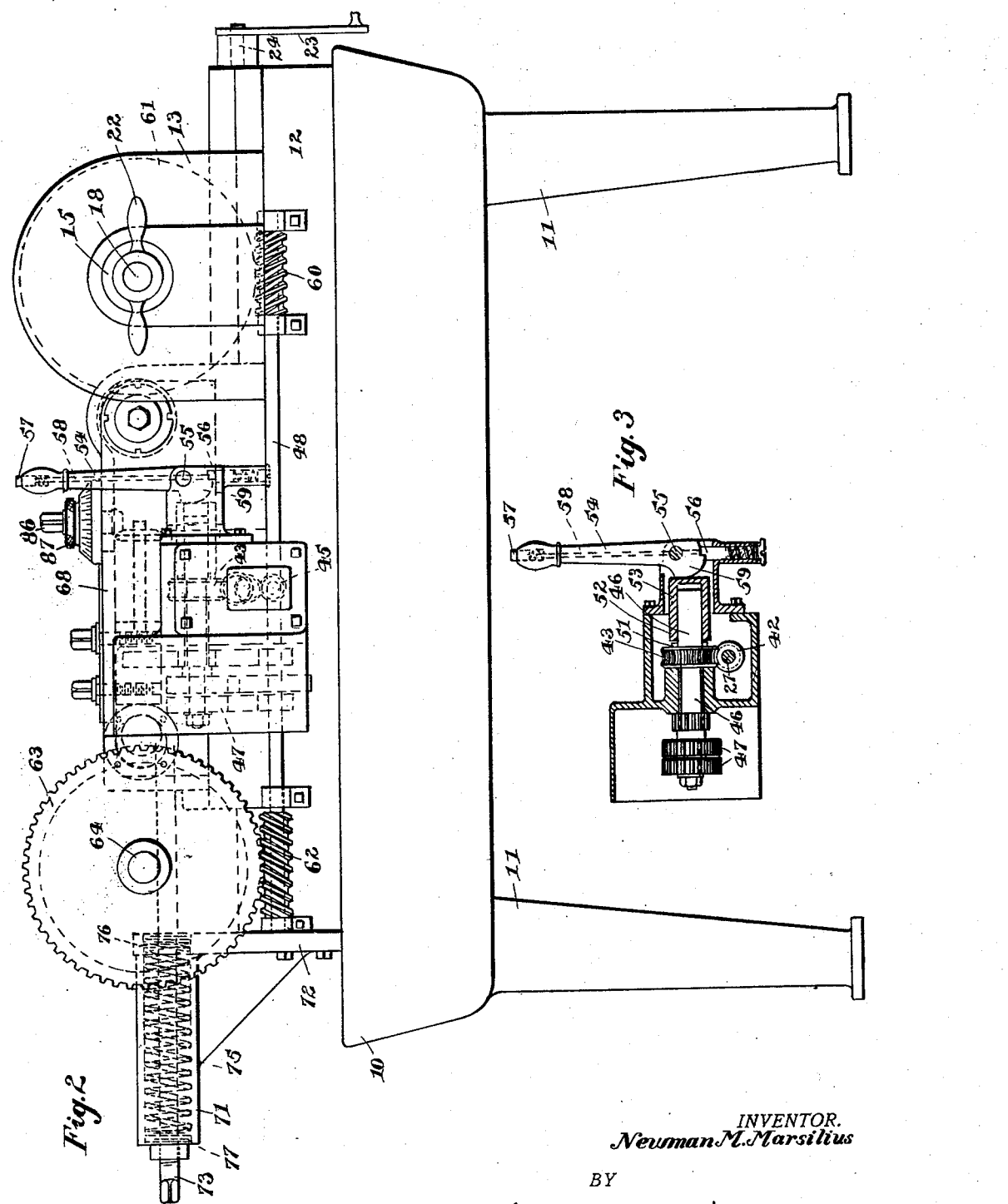

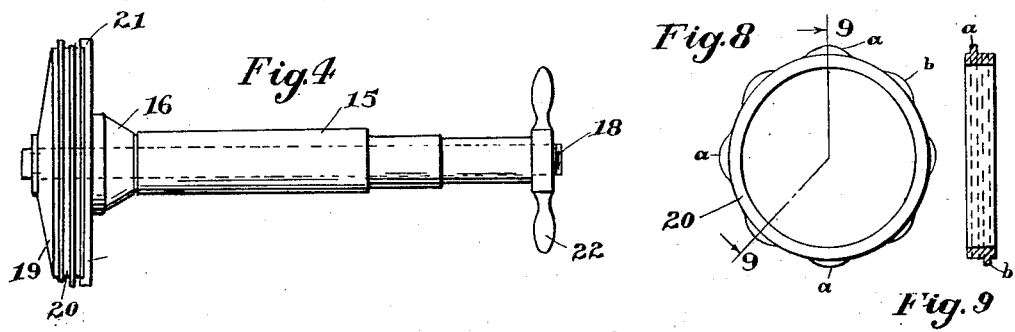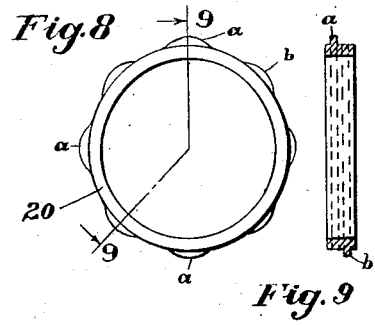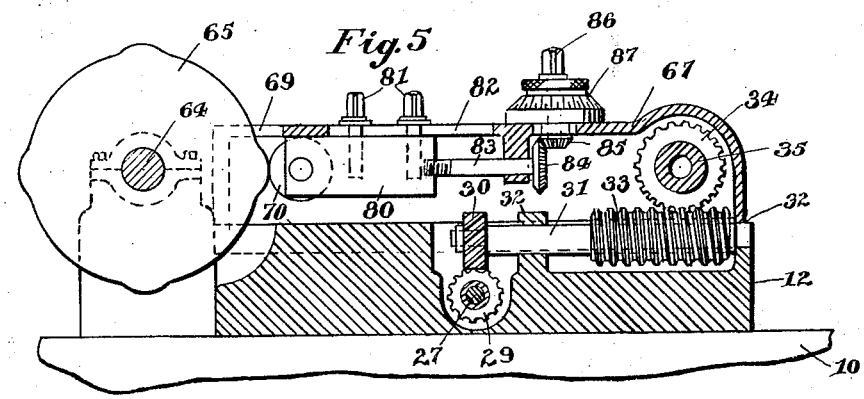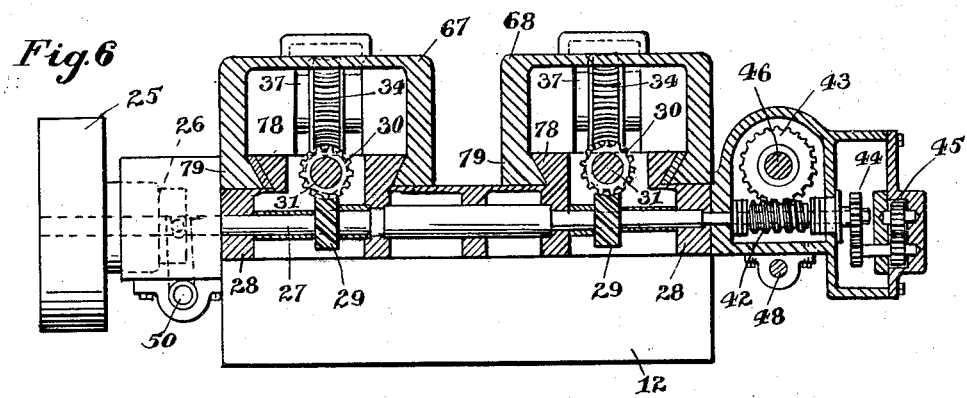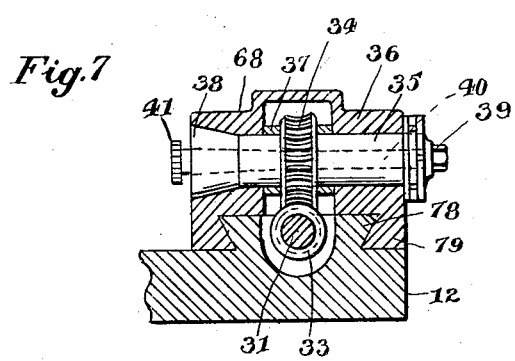

Patented Oct. 11, 1932

1,881,794

UNITED STATES PATENT OFFICE

NEWMAN M. MARSILIUS, OF BRIDGEPORT, CONNECTICUT, ASSIGNOR TO THE PRODUCTO MACHINE COMPANY, OF BRIDGEPORT, CONNECTICUT, A CORPORATION OF CONNECTICUT

CAM MILLING MACHINE

Application filed June 5, 1929. Serial No. 368,496.

This invention relates to new and useful improvements in milling machines and has for an object to generally improve and simplify the construction and operation of such machines.

Another object of the invention is to provide a milling machine adapted to operate on a plurality of pieces of work, the machine including a plurality of milling cutters adapted to be alternately and automatically brought into engagement with the work.

A further object is to provide a milling machine including rotary cutters adapted to be reciprocated to and from the work, and means operable from a remote point for controlling the operation of the cutters, and other means for controlling the speed of operation as to the reciprocatory movement of the cutters.

Other objects are to provide a milling machine including improved work holders, improved means whereby the cutters may be rotated and reciprocated with their support in opposed relation, improved controlling and operating means for the cutters, improved mounting and driving means for the cutter spindles and other improvements as will be apparent from a consideration of the following detailed description taken in connection with the accompanying drawings.

While the accompanying drawings and the following description illustrate and describe a satisfactory embodiment of the invention, it is to be understood that this is for the purpose of making clear an embodiment of the invention and is not to be considered as limiting to its scope. Since changes will readily suggest themselves, reference must be had to the annexed claims for a definition of the limitations of the invention herein disclosed.

In the drawings:

Fig. 2 is a side elevational view thereof;

Fig. 3 is a detail sectional view showing the control for the speed changing gearing, taken on line 3—3 of Fig. 1;

Fig. 4 is a side elevation of work holder and spindle detached;

Fig. 5 is a longitudinal sectional view taken along the line 5—5 of Fig. 1;

Fig. 6 is a vertical cross sectional view taken along the line 6—6 of Fig. 1;

Fig. 7 is a detail sectional view taken along the line 7—7 of Fig. 1;

Fig. 8 is a side elevation of a cam as milled by my machine; and

Fig. 9 is a sectional view thereof along the line 9—9 of Fig. 8.

Figure 1:
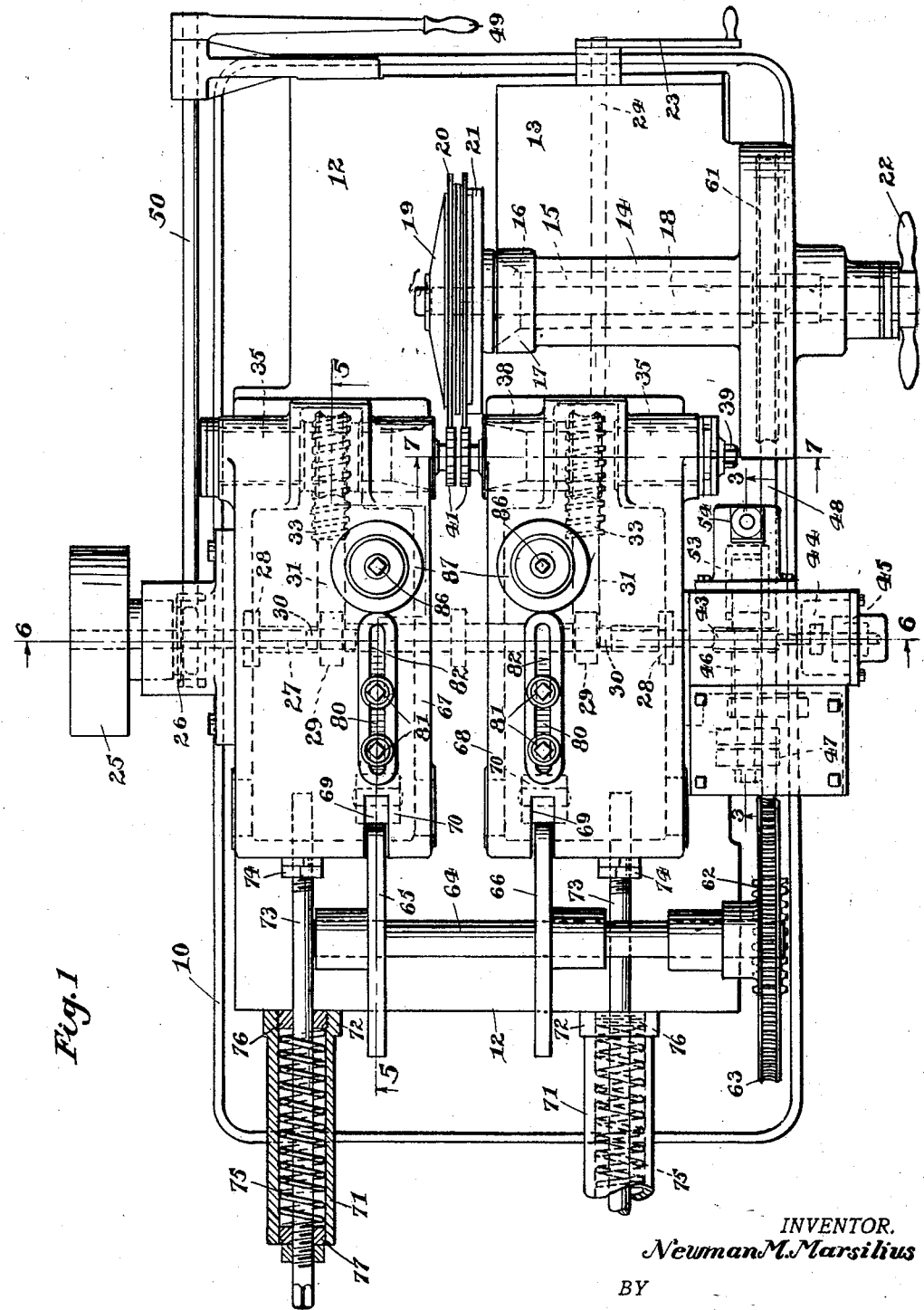
Fig. 1 is a plan view of the improved milling machine.

Referring in detail to the drawings, the machine includes a base 10 mounted on uprights or legs 11 and carrying a table or bed 12 on which the operating parts of the machine are mounted.

At the forward end of the machine is mounted an adjustable support 13 for the work holder. This work holder includes a bearing 14 rigid with the support 13 and through which extends a work spindle 15.

Spindle 15 is of course rotatable in bearing 14 and near its work carrying end is provided with a cone-shaped portion 16 corresponding to the cone-shaped depression 17 in the bearing. Further, a shaft 18 extends through spindle 15 and carries a work clamping plate 19 adapted to be drawn into contact with the work 20 to clamp the work between plate 19 and a co-operating clamping plate 21. As a means of drawing plate 19 into operative position the rear end of shaft 18 is threaded and a capstan nut 22 used to draw the parts into secured position. Through manipulation of a crank 23 and a screw 24 the support 13 may be adjusted along the bed or table to accommodate different sizes of work.

Power for the machine is delivered to a pulley 25 and through a clutch 26 to a shaft 27 running transversely of the machine (see Figs. 1 and 6). Shaft 27 turns in bearings 28 and carries a pair of spiral gears 29 driving similar worm gears 30 on shafts 31 extending longitudinally of the machine.

The shafts 31 are journaled in bearings 32 and between the bearing carrying worms 33 meshing with and driving worm gears 34 on the cutter shafts or spindles 35 which as clearly shown extend transversely of the machine. A detail view of the mounting of the cutter shafts 35 is given in Fig. 7. Here it will be seen that the shafts have a solid mounting in bearings 36 and that due to collars 37 the worm gears 34 are held against lateral movement.

Shafts 35 have cone-shaped portions 38 received in similarly shaped bearings and the shafts are secured by these portions and by suitable clamping means 39 on the end of shafts 40 extending through spindles 35 and carrying the rotary cutters 41 on their outer ends. An inspection of Figs. 5, 6 and 7 clearly show that all the gearing is enclosed to run in oil.

Extending beyond gears 29, the shaft 27 carries a worm 42 driving a worm gear 43. Beyond worm 42, the shaft 27 drives gears 44 in turn driving a pump 45 for supplying a liquid, as soapy water, to the cutters. Worm gear 43 is mounted upon a short shaft 46 provided with change speed gears 47 through which a longitudinal shaft 48 is driven for a purpose to be described.

A hand lever 49 through a shaft or rod 50 serves to control the clutch 26 to connect the pulley 25 to the shaft 27 and to disconnect it therefrom. Gear 43 is mounted upon a sleeve having a clutch face 51, see Fig. 3, to be engaged by a similar clutch face 52 carried by a sleeve or cap 53 on shaft 46 whereby the gear 43 may be connected to and disconnected from the shaft.

For the purpose of operating sleeve 53, a cam lever 54 is provided, pivotally mounted as at 55 and adapted to be held in position by a spring actuated pawl 56. Depression of finger piece 57, carried by lever 54, through rod 58 depresses pawl 56 enabling lever 54 to be operated. Through its cam portion 59 the lever may move sleeve 53 to bring the clutch faces 51 and 52 into clutching engagement whereby to cause the gear 43 to drive the shaft 46.

At its forward end shaft 48 carries a worm 60 meshing with and driving a large worm wheel 61 on the spindle shaft 15. Through this arrangement the spindle and work carried thereby is rotated.

In addition to the rotary movement which is delivered to the cutters 41 as herein before described, the cutters are given a reciprocatory movement. To this end, mounted rearwardly on shaft 48 is a worm 62 meshing with and driving a worm wheel 63 on a transversely extending cam shaft 64. Shaft 64 carries a pair of cams 65 and 66, each adapted to impart movement to one of the cutter carriers 67 and 68.

The cams 65 and 66 extend into the notches 69 in the carriers and engage rollers 70 to move the carriers or slides. For the purpose of keeping cams 65 and 66 in contact with their respective rollers 70, springs means are provided. This spring means includes a casing 71 for each of the slides or carriers, the casings being mounted or forming part of uprights 72 secured to the bed of the machine.

Further, from each of the slides or carriers 67 and 68 a rod 73 projects, the same being secured by lock nuts 74, the rods 73 projecting through the casings or housings 71 and being surrounded within the casings by coil springs 75. These coil springs bear at their respective ends against the stationary part 76 and the movable part 77, this latter being carried by the rods and movable through the casings 71. It will be apparent that the springs 75 tend to hold the rollers 70 of the respective carriers in engagement with the cams 65 and 66.

Fig. 6 clearly shows the manner in which the carriers or slides 67 and 68 are mounted on the bed 12 for sliding movement therealong. The bed has upwardly extending undercut portions 78 against which slide the inclined portions 79 of the carriers. As the carriers move forwardly the worm gear 34 rolls on the worm 33.

The cutter carriers or slides are adjustable to take care of different depth cuts and of different sizes of work. To this end the rollers 70 are carried by blocks 80 secured to the carriers as by bolts 81 operating in slots 82. Shafts 83 have threaded connection with blocks 80 and carry beveled gears 84 meshing with beveled gears 85 on shafts 86 of micrometer dials 87. Thus by loosening bolts 81 and turning the micrometer shafts 86 the blocks 80 may be moved forwardly or rearwardly and the parts locked in adjusted position by again tightening the bolts 81.

It will be apparent from Fig. 1, that the cutters 41 are arranged adjacent each other and in line with the work 20, whereby as they are reciprocated they are moved into and out of contact with the work. Further through clutch 26 the power to the entire machine may be cut off on manipulation of lever 49 and rotation of spindle 15 and reciprocation of the cutters 41 may be discontinued by operating lever 54.

The machine is particularly adapted for milling the annular surfaces of airplane cams of the type shown in Figs. 8 and 9 wherein it will be seen the ring cam therein illustrated is provided with two spaced apart annular cam surfaces $a$ and $b$, each having alternate high and low portions, the high portion of one annular cam registering with the low portion of the other. The milling of these two surfaces simultaneously by my machine obviously necessitates alternate operations of the respective slides that is a forward movement of one while a rearward movement is imparted to the other. Any difference in length of travel of these slides, may obviously be obtained by substituting different size and shaped operating cams 65 and 66.

Having thus described the invention, what is claimed is:

1. In a milling machine, the combination with a bed, a driving shaft mounted thereon, a pair of cutter slides mounted for reciprocatory movement on said bed, short shafts mounted in the bed one for each slide, gear connections between the driving shaft and said short shafts, a cutter spindle carried by each slide and geared to be driven by said short shafts, the said spindles of the respective slides being normally in axial alignment, adjacently positioned cutters mounted upon said spindles, a rotatable work holder for supporting pieces to be milled by said cutters, a cam shaft for reciprocating the slides in opposed relation, a driven shaft having connections for operating said work holder and said cam shaft, change gear driven means intermediate of the driving shaft and said driven shaft whereby the speed of the work holder and cam shaft may be varied with relation to the cutter shafts.

2. In a milling machine, the combination with a bed, a reciprocatory slide mounted thereon, a cam and cam shaft, a roller supporting block adjustably mounted in the slide, means for adjusting the block with respect to the slide, means for securing the block in its adjusted position, a driving shaft carried within the bed, a short driven shaft, a worm on the short driven shaft, a cutter spindle carried by the slide, a worm gear upon the cutter spindle adapted to be rotated by the worm, and to be moved with the slide longitudinally of and with respect to the said short driven shaft.

3. In a milling machine, a bed, a cutter carrying slide on said bed, a horizontal driving shaft extending across said bed, a cam shaft at one end of bed, a work carrying spindle at the other end of said bed, said cam shaft, work spindle, cutter spindle and driving-shaft arranged in parallel relation, a horizontal shaft arranged substantially at right angles to said shafts and driven from said driving-shaft and driving the cam shaft and work spindle, a shaft parallel to the second mentioned horizontal shaft and driven from the driving shaft and driving the cutter spindle, and a cam on the cam shaft for moving the cutter carrying slide toward and from the work.

4. The combination as in claim 3, said cutter spindle being movable with the slide, said last named shaft being mounted for rotary movement only, and a driving connection between said shaft and spindle to permit relative movement between, while still in driving relation.

5. In a milling machine, the combination with a bed, a cam shaft on the bed, a reciprocatory slide mounted thereon having a slot formed therein, a roller supporting block, screws extending through the slots and engaging the block for adjustment of the slide, means for adjusting the block with respect to the slide when the screws are loosened, said means including a shaft having threaded connections with the block, a micrometer dial geared to said shaft to rotate the same in either direction to determine the amount of the adjustment with respect to the cam shaft, a cutter and cutter shaft carried by the slide, an operating shaft, a worm and gear connecting the operating shaft and the cutter shaft whereby one shaft and its gear is adapted to be moved longitudinally of and with respect to the other.

Signed at Bridgeport in the county of Fairfield and State of Connecticut this 4th day of June A. D. 1929.

NEWMAN M. MARSILIUS.